United States Patent Office 2,830,088
Patented Apr. 8, 1958

2,830,088

NEW SERIES OF THIO-DERIVATIVES OF BASIC BENZHYDRYL ETHERS AND THIOETHERS

Oluf Herman Hubner, Charlottenlund, and Povl Viggo Petersen, Copenhagen, Denmark No Drawing. Application May 5, 1953
Serial No. 353,234

Claims priority, application Denmark May 8, 1952

14 Claims. (Cl. 260—570)

This invention relates to a new series of chemical compounds having pharamaceutical value, especially as sedatives and antispasmodics. The new series includes a number of closely-related thio-derivatives of basic benzhydryl ethers and thioethers described by the general formula:

$$\text{(A)}$$

wherein

R represents hydrogen, chlorine, bromine and iodine
$R_1$ represents alkylsulfonyl, alkylmercapto, phenylmercapto, substituted phenylmercapto, cycloalkylmercapto, substituted cycloalkylmercapto and, except when $R_2$ represents hydrogen, hydrogen
$R_2$ represents alkylsulfonyl, alkylmercapto, phenylmercapto, substituted phenylmercapto, cycloalkylmercapto, substituted cycloalkylmercapto and, except when $R_1$ represents hydrogen, hydrogen
Z represents oxygen and sulfur
X represents dialkylaminoalkyl, piperidyl-substituted alkyl and N-alkyl-substituted C-piperidyl Our new series of compounds also includes the salts of the basic compounds represented by the above formula with organic and inorganic acids such as hydrochloric, hydrobromic, phosphoric, sulfuric, acetic, citric, oxalic, tartaric, salicylic and benzoic acids as well as their corresponding quaternary ammonium salts.

The compounds of our new series may be prepared by the reaction of a benzhydryl halide of the formula:

$$\text{(I)}$$

wherein R, $R_1$ and $R_2$ have the significance given above and hal represents a halogen with a compound of the formula:

$$\text{V—Z—X} \quad \text{(II)}$$

wherein Z and X have the significance given above and V represents hydrogen and an alkali metal such as sodium or potassium.

In preparing the ethers of the above Formula A we have found it particularly satisfactory to react the benzhydryl halide (I) with an amino-alcohol (II). The reaction may be performed in the presence of an inert organic solvent or in a water-organic solvent with or without the addition of acid binding agents and preferably temperatures lower than or corresponding to the boiling point of the solvent are used. Higher temperatures may also be employed although ordinarily they do not offer extra advantages. Suitable solvents are by way of example methanol, aqueous methanol, ethanol, aqueous ethanol, isopropanol, aqueous dioxane, benzene, toluene, xylene, terpentine, pyridine, and di-n-butyl ether. As acid binding agents we may use those ordinarily used for such purposes such as the oxides and hydroxides of alkali and alkaline earth metals and alkali metal carbonates and bicarbonates.

Neither a solvent nor an acid binding agent is necessarily required. Thus we obtained very satisfactory results when simply heating together the benzhydryl halide (I) and an amino alcohol (II), in which case a temperature at about 120–130° C. causes the reaction to proceed particularly smoothly.

The reaction between the benzhydryl halide and the amino alcohol may also be performed as a two-step reaction when simply mixing the benzhydryl halide (I) and the amino alcohol (II) without heating. Under these conditions a quaternary N-compound is formed as an intermediate by the addition of the benzhydryl halide (I) directly on the N-atom of the amino alcohol. If desired, this quaternary N-compound may be purified in known way before being re-arranged into the desired ether of the above general Formula A by heating.

The new ethers of the above Formula A we may also prepare by the interaction of the benzhydryl halide (I) with an alkali metal salt previously prepared from the amino alcohol and we then prefer to perform the reaction in a solvent of the type mentioned.

Similarly, we have found it very satisfactory to prepare the thioethers of our new series of compounds by reacting the benzhydryl halide (I) with an amino thioalcohol or its alkali metal salt (II) under the conditions above described for the interaction between the benzhydryl halide and an amino alcohol or its alkali metal salt respectively.

The compounds of our invention may also be prepared by the reaction of a compound of the formula:

$$\text{CH—Z—V} \quad \text{(III)}$$

with a compound of the formula:

$$\text{hal—X} \quad \text{(IV)}$$

wherein R, $R_1$, $R_2$, Z, V, X and hal have the significance given above.

Also in this method of preparation a solvent is not necessarily required in all cases. Thus we have found that the new ethers of the general Formula A may be obtained by simply heating together a benzhydrol (III) and an amino halide (IV). The reaction may, however, as well be performed in the presence of an inert organic solvent of the type above mentioned.

Our new ethers we may further prepare by reacting an alkali metal salt of the benzhydrol (III) with the amino halide under the conditions above used for the reaction between the benzhydryl halide and an alkali metal salt of the amino alcohol.

Likewise, we may prepare our new thioethers by reacting a benzhydryl thioalcohol or an alkali metal salt of the same (III) with an amino halide (IV) under the conditions above used for the reaction between the benzhydryl halide and an amino alcohol or an alkali metal salt of same respectively. When hereby using an alkali metal salt previously prepared from the benzhydryl thioalcohol the reaction is conveniently performed in the medium in which the alkali metal salt was formed, f. ex. in alcohol or in aqueous alcohol. Inert organic solvents may further be present or they may be used as sole solvent during the reaction. Toluene, xylene and di-n-butyl ether are typical examples of suitable inert organic solvents. Most conveniently the reaction is performed by heating the two components in one of the said mediums and particularly suitable are temperatures corresponding to the boiling point of the medium used. Higher as well as lower temperatures may as well be used, although they ordinarily do not offer special advantages.

In general, it has been found most convenient to produce the compounds of our invention in the form of the hydrohalide salt. However, on treatment with alkali, in the usual manner, the hydrohalide readily yields the corresponding free base which may then be converted, if desired, to an acid addition salt by reaction with the appropriate acid. Quaternary ammonium salts may be obtained by reacting the free base with an alkyl salt such as methyl bromide, ethyl iodide and the like.

The various members of our new series of compounds, while differing from each other somewhat in degree of pharmaceutical utility, are generally characterized by powerful sedative properties; several of the members of our new series, notably p-butylmercaptobenzhydryl 2-dimethylaminoethyl sulfide hydrochloride, m-butylmercaptobenzhydryl 2-dimethylaminoethyl sulfide hydrochloride, m-hexylmercaptobenzhydryl 2-dimethylaminoethyl sulfide hydrochloride and p,p'-bis(butylmercapto)-benzhydryl 2-diethylaminoethyl sulfide hydrochloride, exhibit an intensity of sedation which exceeds even that of most barbiturates. The members of our new series of compounds have the further and surprising characteristic that the sedative action thereof is not accompanied by hypnosis, which renders the use thereof of peculiar value when it is sought to calm the patient to whom they are administered without inducing sleep. The members of our new series of compounds are, in general, further characterized by a lower degree of toxicity than is usual in prior art sedatives.

We have found that among our new series of basic benzhydryl ethers and thioethers those compounds in which the amino group is connected with the oxygen atom or the sulphur atom, as the case may be, through an alkylene group generally possess sedative and spasmolytic activity in a particular high degree, and especially when the alkylene group contains 2–4 carbon atoms our new compounds are as a rule strongly active. Generally, best activities will be obtained in case the alkylene group is ethylene.

Those of our new compounds in which the amino group is a morpholino group ordinarily are remarkable because of their lower degree of toxicity, and similarly the benzhydryl thioethers of the above Formula A generally possess especially pronounced sedative effect and low toxicity.

Likewise, we have found that those of our new compounds in which one or both phenyl rings in the benzhydryl group are substituted by a mercapto group are particularly active. Among the mercapto groups we prefer the lower alkylmercapto groups and especially those having from 4–8 carbon atoms such as butylmercapto, hexylmercapto and octylmercapto as they will generally render our new compounds especially active. Other mercapto groups such as phenylmercapto, cyclohexylmercapto and their lower alkyl substituted homologs f. ex. methylphenylmercapto and methylcyclohexylmercapto may, however, be used still with satisfactory results.

The members of our new series of compounds have, in in vitro experiments, exhibited remarkable activity in preventing smooth muscle spasm of the guinea pig intestine, of the type which would be induced by such agents as acetylcholine, barium chloride and histamine. For example, several of the members of our new series of compounds are 20 or more times as effective as papaverine in their antispasmodic action against barium chloride-induced spasm.

Those of our new compounds, in which the amino group is a piperidino group generally possess an especially pronounced spasmolytic activity.

In order that our invention may be entirely available to those skilled in the art, methods for making a number of the new compounds of the series are described briefly:

EXAMPLE I

*p-Butylmercaptobenzhydryl 2-dimethylaminoethyl ether hydrochloride* p-Butylmercaptobenzophenone (M. P. 46–48° C.) was prepared from p-n-butyl phenyl sulfide (B. P. 156° C. at 60 mm.) using a procedure similar to that described for p-ethylmercaptobenzophenone by Auwers and Beger in the Berichte der deutschen chemischen Gesellschaft, volume 27, page 1734 (1894), and was reduced with zinc and sodium hydroxide in alcohol to p-butylmercaptobenzhydrol. The latter was then converted to p-butylmercaptobenzhydryl chloride (a yellow oil) by saturation of an ether solution thereof with anhydrous hydrogen chloride. (All the p-alkyl phenyl sulfides and the p-cycloalkyl phenyl sulfide used in this and subsequent examples were prepared by treating an alcohol solution of sodium thiophenol with the appropriate alkyl bromide or cycloalkyl bromide.)

p-Butylmercaptobenzhydryl chloride (48 g.) was mixed with 2-dimethylaminoethanol (35 g.) and heated in an oil bath at 120–130° C. for four hours. The mixture was cooled, treated with 2 N aqueous sodium hydroxide solution (300 ml.) whereupon an oil separated which was taken up in ether. The ether solution was twice washed with water and then shaken with 2 N hydrochloric acid (300 ml.). The resulting middle oily layer was separated and dissolved in water and the resulting aqueous solution was washed with ether, then treated with aqueous sodium hydroxide solution to precipitate an oil. The latter was dissolved in ether, dried with anhydrous potassium carbonate. An ether solution of hydrogen chloride was then added, whereupon a white crystalline solid precipitated which was collected by filtration and dried in a desiccator. The solid obtained had a melting point of 116° C., and was the desired p-butylmercaptobenzhydryl 2-dimethylaminoethyl ether hydrochloride.

EXAMPLE II

*m-Butylmercaptobenzhydryl 2-dimethylaminoethyl ether hydrochloride* m-Butylmercaptobenzhydryl chloride was prepared from m-butylmercaptobenzophenone in a manner similar to that used for the preparation of the corresponding p-compound of Example I. The m-butylmercaptobenzophenone (B. P. 180° C. at 0.8 mm.) was prepared from m-butylmercaptobenzoyl chloride (Petersen, Acta Pharmacol., volume 4, page 201 (1948)), benzene and anhydrous aluminium chloride in carbon disulfide, by the Friedel-Crafts synthesis.

m-Butylmercaptobenzhydryl chloride (48 g.) was mixed with 2-dimethylaminoethanol (35 g.) and heated at 120–130° C., in an oil bath for 4 hours. The reaction product was subjected to treatment as indicated in Example I and the desired m-butylmercaptobenzhydryl 2-dimethylaminoethyl ether hydrochloride was obtained as a colorless syrup. The corresponding methiodide was prepared by regenerating the free base and treating the latter with methyl iodide in ether solution. The quaternary salt had the melting range 77–79° C.

EXAMPLE III

*p-Butylmercaptobenzhydryl 4-dimethylaminobutyl ether hydrochloride* p-Butylmercaptobenzhydryl chloride (Example I) (48 g.) was mixed with 4-dimethylaminobutanol (40 g.) and the mixture was heated at 120–130° C. in an oil bath for 4 hours. After subjecting the reaction mixture to treatment as described in Example I, the desired p-butylmercaptobenzhydryl 4-dimethylaminobutyl ether hydrochloride was obtained as a colorless syrup.

EXAMPLE IV

*p-Butylmercaptobenzhydryl 2-(4-morpholinyl) ethyl ether hydrochloride* p-Butylmercaptobenzhydryl chloride (48 g.) was mixed with 2-(4-morpholinyl)-ethanol (40 g.) and the mixture was heated at 130° C. in an oil bath for 4 hours. After subjecting the reaction product to treatment as described in Example I, the desired p-butylmercaptobenzhydryl 2-(4-morpholinyl)ethyl ether hydrochloride was obtained as a colorless syrup.

EXAMPLE V

*p-Butylmercaptobenzhydryl 2-diethylaminoethyl sulfide hydrochloride* p-Butylmercaptobenzhydryl chloride (Example I) was boiled with thiourea in alcohol thereby yielding p-butylmercaptobenzhydrylisothiouronium chloride which was then subjected to hydrolysis with dilute aqueous sodium hydroxide solution whereupon p-butylmercaptobenzhydryl mercaptan was formed.

p-Butylmercaptobenzhydryl mercaptan (28.5 g.) was added to a solution of sodium (2.3 g.) in absolute alcohol (75 ml.), followed by the addition of a solution of diethylaminoethyl chloride (13.6 g.) in toluene (50 ml.). The mixture was boiled on a steam bath for 3 hours and the sodium chloride which separated out was removed by filtration. The filtrate was concentrated to one third of its volume and dissolved in ether. The ether solution was shaken with 2 N hydrochloric acid (100 ml.), and the resulting middle oily layer was separated, dissolved in water and the resulting aqueous solution was washed with ether, then treated with aqueous sodium hydroxide solution to precipitate an oil. The latter was dissolved in ether, dried with anhydrous potassium carbonate, filtered and then treated with anhydrous hydrogen chloride whereupon the desired p-butylmercaptobenzhydryl 2-diethylaminoethyl sulfide hydrochloride precipitated as a white, crystalline substance which was filtered and dried in a desiccator. The melting point of the product was 124° C.

EXAMPLE VI

*p-Butylmercaptobenzhydryl 2-dimethylaminoethyl sulfide hydrochloride*

To a solution of sodium (2.3 g.) in absolute alcohol (75 ml.), p-butylmercaptobenzhydryl mercaptan (28.5 g.) was added, followed by a solution of 2-dimethylaminoethyl chloride (10.8 g.) in toluene (50 ml.). The reaction mixture was boiled on a steam bath for 3 hours and was subjected to treatment as described in Example V, whereupon the desired p-butylmercaptobenzhydryl 2-dimethylaminoethyl sulfide hydrochloride was obtained as a white crystalline solid, M. P. 131–132° C.

EXAMPLE VII

*m-Butylmercaptobenzhydryl 2-dimethylaminoethyl sulfide hydrochloride* m-Butylmercaptobenzhydryl chloride (Example II) was converted to m-butylmercaptobenzhydryl mercaptan by the procedure described for the corresponding p-compound in Example V.

m-Butylmercaptobenzhydryl mercaptan was reacted with 2-dimethylaminoethyl chloride by the procedure described in Example VI whereupon the desired m-butylmercaptobenzhydryl 2-dimethylaminoethyl sulfide hydrochloride was obtained as a white crystalline solid, M. P. 95–98° C.

EXAMPLE VIII

*m-Hexylmercaptobenzhydryl 2-dimethylaminoethyl sulfide hydrochloride* m-Hexylmercaptobenzhydryl chloride was prepared in the same manner as the butyl homolog thereof in Example II, and the chloride was then converted to m-hexylmercaptobenzhydryl mercaptan in the manner described for the butyl homolog in Example VII.

To a solution of sodium (2.3 g.) in absolute alcohol (75 ml.), m-hexylmercaptobenzhydryl mercaptan (30.9 g.) was added, followed by a solution of 2-dimethylaminoethyl chloride (10.8 g.) in toluene (50 ml.). The reaction mixture was boiled on a steam bath for 3 hours and was subjected to treatment as described in Example V, whereupon the desired m-hexylmercaptobenzhydryl 2-dimethylaminoethyl sulfide hydrochloride was obtained as a colorless syrup.

EXAMPLE IX

*p-Ethylmercaptobenzhydryl 2-dimethylaminoethyl sulfide hydrochloride*

To a solution of sodium (2.3 g.) in absolute alcohol (75 ml.), 25.7 g. of p-ethylmercaptobenzhydryl mercaptan (prepared in the same manner as the corresponding butyl compound in Example V) was added, followed by a solution of 2-dimethylaminoethyl chloride (10.8 g.) in toluene (50 ml.). The mixture was boiled on a steam bath for 3 hours and was subjected to treatment as described in Example V, whereupon the desired p-ethylmercaptobenzhydryl 2-dimethylaminoethyl sulfide hydrochloride was obtained as a white, crystalline solid, which upon recrystallization from a mixture of acetone and ethanol, had the melting range 152–153° C.

EXAMPLE X

*p-Isopropylmercaptobenzhydryl 2-dimethylaminoethyl sulfide hydrochloride* p-Isopropylmercaptobenzhydryl chloride was prepared from p-isopropylmercaptobenzhydryl (B. P. 128–130° C. at 60 mm.) in a manner similar to the preparation of the corresponding p-butylmercaptobenzhydryl chloride in Example I. The former chloride was converted to p-isopropylmercaptobenzhydryl mercaptan in a manner similar to that described in Example V for the conversion of p-butylmercaptobenzhydryl chloride to the corresponding mercaptan.

To a solution of sodium (2.3 g.) in absolute alcohol (75 ml.), p-isopropylmercaptobenzhydryl mercaptan (27.1 g.) was added followed by a solution of dimethylaminoethyl chloride (10.8 g.) in toluene (50 ml.). The mixture was boiled on a steam bath for 3 hours and was subjected to treatment as described in Example V, whereupon p-isopropylmercaptobenzhydryl 2-dimethylaminoethyl sulfide hydrochloride was obtained as a white crystalline solid, which upon recrystallization from a mixture of acetone and ethanol, had the melting range 169–170° C.

EXAMPLE XI

*o-Butylmercaptobenzhydryl 2-dimethylaminoethyl sulfide hydrochloride*

Thiosalicylic acid was alkylated with butyl bromide yielding o-butylmercaptobenzoic acid (M. P. 94° C.) which was then converted, with thionyl chloride, to o-butylmercaptobenzoyl chloride. The latter chloride was converted, by the Friedel-Crafts reaction, to o-butylmercaptobenzophenone (B. P. 175–176° C. at 2 mm.) which was then converted to o-butylmercaptobenzhydryl mercaptan in the manner described for the corresponding p-compound in Example V.

To a solution of sodium (2.3 g.) in absolute alcohol (75 ml.), o-butylmercaptobenzhydryl mercaptan (28.5 g.) was added, followed by a solution of 2-dimethylaminoethyl chloride (10.8 g.) in toluene (50 ml.). The mixture was boiled on a steam bath for 3 hours, and was subjected to treatment as described in Example V, whereupon the desired o-butylmercaptobenzhydryl 2-dimethylaminoethyl sulfide hydrochloride was obtained as a white crystalline substance, which upon recrystallization from acetone had the melting range 114–117° C.

EXAMPLE XII

*p-Butylmercaptobenzhydryl 2-dimethylaminopropyl sulfide hydrochloride*

To a solution of sodium (2.3 g.) in absolute ethanol (75 ml.), p-butylmercaptobenzhydryl mercaptan (28.5 g.) was added, followed by a solution of 1-chloro-2-dimethylaminopropane (12.2 g.) in toluene (50 ml.). The reaction mixture was boiled on a steam bath for 3 hours, and was subjected to treatment as described in Example V, whereupon the desired p-butylmercaptobenzhydryl 2-dimethylaminopropyl sulfide hydrochloride was obtained as a colorless syrup.

The corresponding citrate (M. P. 133–135° C.) was obtained as a white crystalline solid, by treatment of a solution of the free base in ether with a solution of citric acid in acetone.

EXAMPLE XIII

*p-Butylsulfonylbenzhydryl 2-dimethylaminoethyl sulfide hydrochloride* p-Butylmercaptobenzophenone was oxidized with hydrogen peroxide in glacial acetic acid producing p-butylsulfonylbenzophenone, M. P. 82–84° C. This substance was converted to p-butylsulfonylbenzhydryl chloride in a manner similar to that described for p-butylmercaptobenzophenone in Example I. The p-butylsulfonylbenzhydryl chloride was then converted to the corresponding mercaptan in the manner described for p-butylmercaptobenzhydryl chloride in Example V.

To a solution of sodium (2.3 g.) in absolute alcohol (75 ml.), p-butylsulfonylbenzhydryl mercaptan (3.17 g.) was added, followed by a solution of 2-dimethylaminoethyl chloride (10.8 g.) in toluene (50 ml.). The reaction mixture was boiled on a steam bath for 3 hours and was subjected to treatment as described in Example V, whereupon the desired p-butylsulfonylbenzhydryl 2-dimethylaminoethyl sulfide hydrochloride was obtained as a white crystalline substance, which, upon recrystallization from a mixture of acetone and isopropyl ether had the melting range 131–133° C.

EXAMPLE XIV

*p-Butylmercaptobenzhydryl 2-dimethylaminopropyl ether hydrochloride* p-Butylmercaptobenzhydryl chloride (48 g.) was mixed with 2-dimethylaminopropanol-(1) (37 g.) and the mixture was heated at 130° C., in an oil bath for 4 hours. The reaction mixture was subjected to treatment as described in Example I, whereupon the desired p-butylmercaptobenzhydryl 2-dimethylaminopropyl ether hydrochloride was obtained as a colorless syrup.

EXAMPLE XV

*p-Butylmercaptobenzhydryl 4-(1-methyl)-piperidyl sulfide hydrochloride*

To a solution of sodium (2.3 g.) in absolute alcohol (75 ml.), p-butylmercaptobenzhydryl mercaptan (28.5 g.) was added, followed by a solution of 4-chloro-1-methyl-piperidine (13.4 g.) in toluene (50 ml.). The mixture was boiled on a steam bath for 3 hours and was subjected to treatment as described in Example V, whereupon the desired p-butylmercaptobenzhydryl 4-(1-methyl)-piperidyl sulfide hydrochloride was obtained as a white crystalline solid, M. P. 128–130° C.

EXAMPLE XVI

*m-Bromo-p'-butylmercaptobenzhydryl 2-diethylaminoethyl sulfide citrate*

Butyl phenyl sulfide (83 g.) was reacted with m-bromobenzoyl chloride (100 g.) in the presence of anhydrous aluminium chloride (90 g.), using carbon disulfide (500 ml.) as the solvent, whereupon m-bromo-p'-butylmercaptobenzophenone (148 g.), B. P. 222–225° C. at 2 mm., M. P. 48–50° C., was obtained. This product was dissolved in alcohol and reduced by means of zinc and potassium hydroxide, yielding m-bromo-p'-butylmercaptobenzhydrol, a colorless oil. The latter was dissolved in ether and treated with hydrogen chloride whereupon m-bromo-p'-butylmercaptobenzhydryl chloride was obtained.

m-Bromo-p'-butylmercaptobenzhydryl chloride (72 g.) was added to 2-diethylaminoethyl mercaptan (65 g.) and the mixture was heated at 130° C., in an oil bath for 4 hours. The reaction mixture was cooled, made alkaline with aqueous sodium hydroxide and extracted twice with 150 ml. ether. The joined ether solutions were washed thrice with 150 ml. water, then shaken with 2 N hydrochloric acid (300 ml.) and the resulting middle oily layer was separated, dissolved in water and the resulting aqueous solution was washed with ether, then treated with aqueous sodium hydroxide (4 N) and extracted with ether. The ether solution was dried with anhydrous potassium carbonate, filtered and treated with an ether solution of citric acid to produce a white, crystalline precipitate, M. P. 87–89° C. of the desired m-bromo-p'-butylmercaptobenzhydryl 2-diethylaminoethyl sulfide citrate.

EXAMPLE XVII

*p,p'-Bis(butylmercapto)-benzhydryl 2-diethylaminoethyl sulfide hydrochloride* p-Butyl phenyl sulfide (Example I) was brominated in glacial acetic acid at room temperature, yielding p-bromophenyl butyl sulfide, B. P. 195–205° C., at 60 mm. This substance was converted to p-butylmercaptobenzoic acid (M. P. 114–116° C.) by carbonation of a Grignard derivative thereof with carbon dioxide. The carboxylic acid was then treated with thionyl chloride to give the corresponding acid chloride (B. P. 142° C., at 2 mm.) which was then reacted with butyl phenyl sulfide in the presence of anhydrous aluminum chloride using carbon disulfide as the solvent, yielding p,p'-bis(butylmercapto)-benzophenone, M. P. 64° C. The latter compound was dissolved in alcohol and reduced with zinc and potassium hydroxide to give p,p'-bis(butylmercapto)-benzhydrol M. P. 28–29° C., which was dissolved in ether and treated with hydrogen chloride whereupon p,p'-bis(butylmercapto)-benzhydryl chloride, was obtained as a colorless oil.

p,p'-Bis(butylmercapto)-benzhydryl chloride (27 g.) was mixed with 2-diethylaminoethyl mercaptan (20 g.) and anhydrous potassium carbonate (20 g.). The mixture was heated at 130° C. in an oil bath for 2 hours. The reaction mixture was subjected to treatment as described in Example XVI, using hydrogen chloride instead of citric acid, whereupon the desired p,p'-bis(butylmercapto)-benzhydryl 2-diethylaminoethyl sulfide hydrochloride was obtained as a white crystalline solid, M. P. 79–80° C.

EXAMPLE XVIII

*p-Methylmercaptobenzhydryl 2-dimethylaminoethyl sulfide hydrochloride* p-Methylmercaptobenzophenone (M. P. 78–80° C.) was reduced with zinc and potassium hydroxide in alcohol to yield p-methylmercaptobenzhydrol (M. P. 94–95° C.). This substance was dissolved in ether and the ether solution was saturated with hydrogen chloride, resulting in the formation of p-methylmercaptobenzhydryl chloride. The latter compound was then converted to p-methylmercaptobenzhydryl mercaptan (a colorless oil) by boiling with thiourea in alcohol followed by hydrolysis with sodium hydroxide.

To p-methylmercaptobenzhydryl mercaptan (38 g.) dissolved in alcohol (170 ml.) was added a solution of sodium hydroxide (12.4 g.) in water (50 ml.) followed by 2-dimethylaminoethyl chloride hydrochloride (25 g.). The reaction mixture was heated 4 hours on the steam bath and then subjected to treatment as described in Example V, whereupon the desired p-methylmercaptobenzhydryl 2-dimethylaminoethyl sulfide hydrochloride was obtained as a white crystalline solid which after recrystallization from a mixture of alcohol and acetone had the melting range 162–163° C.

EXAMPLE XIX

*p-Methylmercaptobenzhydryl 2-(1-piperidyl)-ethyl ether hydrochloride*

A mixture of p-methylmercaptobenzhydryl chloride (31 g.) and 2-(1-piperidyl)-ethanol (33 g.) was heated in an oil bath at 130° C., for 4 hours. The reaction mixture was cooled and subjected to treatment as described in Example I whereupon the desired p-methylmercaptobenzhydryl 2-(1-piperidyl)-ethyl ether hydrochloride was obtained as a white crystalline solid, which upon recrystallization from acetone had the melting range 151–152° C.

EXAMPLE XX

*p-Phenylmercaptobenzhydryl 2-dimethylaminoethyl sulfide hydrochloride*

Diphenyl sulfide was reacted with benzoyl chloride in the presence of anhydrous aluminum chloride in carbon disulfide, resulting in the formation of p-phenylmercaptobenzophenone, M. P. 68–70° C. The latter compound was then reduced with zinc and sodium hydroxide in alcohol to yield p-phenylmercaptobenzhydrol which was then dissolved in ether and the ether solution was saturated with hydrogen chloride. There resulted the formation of p-phenylmercaptobenzhydryl chloride which upon recrystallization from a mixture of ether and petroleum ether, melted at 73–75° C.

p-Phenylmercaptobenzhydryl chloride (40 g.) dissolved in absolute alcohol (65 ml.) was treated with thiourea (10 g.). The mixture was refluxed 2 hours on a steam bath whereafter a solution of sodium hydroxide (24 g.) in water (75 ml.) was added and the heating continued a further 2 hours. A solution of 2-dimethylaminoethyl chloride hydrochloride (28 g.) in 96% alcohol (130 ml.) was then added and the resulting mixture was refluxed 3 hours. The reaction mixture was poured into 5 volumes of water whereupon an oil separated which was taken up in ether and the ether solution was washed with water and shaken with 2 N hydrochloric acid. The acid layer was separated, washed with ether and then treated with sodium hydroxide, whereupon an oil separated which was taken up in ether and the ether solution was dried with anhydrous potassium carbonate, filtered, then saturated with hydrogen chloride, whereupon the desired p-phenylmercaptobenzhydryl 2-dimethylaminoethyl sulfide hydrochloride was obtained as a white crystalline solid which after recrystallization from acetone had the melting range 152–154° C.

EXAMPLE XXI

*p-Cyclohexylmercaptobenzhydryl 2-dimethylaminoethyl sulfide hydrochloride*

Cyclohexyl phenyl sulfide (B. P. 192° C., at 65 mm.) was reacted with benzoyl chloride in the presence of anhydrous aluminum chloride, using carbon disulfide as the solvent, to form p-cyclohexylmercaptobenzophenone. The latter compound was then reduced with zinc and sodium hydroxide in alcohol to yield p-cyclohexylmercaptobenzhydrol which was dissolved in ether and the ether solution was saturated with hydrogen chloride. There resulted p-cyclohexylmercaptobenzhydryl chloride as a yellow oil.

p-Cyclohexylmercaptobenzhydryl chloride (79 g.) was dissolved in absolute alcohol (120 ml.) and treated with thiourea (20 g.). The mixture was refluxed 2 hours on a steam bath, then treated with a solution of sodium hydroxide (48 g.) in water (150 ml.) and refluxing was continued a further 2 hours. A solution of 2-dimethylaminoethyl chloride hydrochloride (56 g.) in alcohol (230 ml.) was then added and refluxing was continued a further 3 hours. Thereafter, the reaction mixture was cooled, poured into 5 volumes of water and subjected to treatment as described in Example XX, whereupon the desired p-cyclohexylmercaptobenzhydryl 2-dimethylaminoethyl sulfide hydrochloride was obtained as a white, crystalline solid, which after recrystallization from acetone had the melting range 148–150° C.

EXAMPLE XXII

*p-Hexylmercaptobenzhydryl 2-dimethylaminoethyl sulfide hydrochloride*

By using n-hexyl phenyl sulfide (B. P. 182° C. at 60 mm.) instead of cyclohexyl phenyl sulfide in Example XXI, p-hexylmercaptobenzhydryl chloride was produced instead of p-cyclohexylmercaptobenzhydryl chloride.

p-Hexylmercaptobenzhydryl chloride (30 g.) dissolved in absolute alcohol (50 ml.) was heated with thiourea (7.5 g.) and the mixture was refluxed 2 hours on a steam bath. A solution of sodium hydroxide (18 g.) in water (60 ml.) was then added, refluxing was continued a further 2 hours and a solution of 2-dimethylaminoethyl chloride hydrochloride (25 g.) in alcohol (100 ml.) was added and refluxing was continued a further 3 hours. The reaction mixture was then poured into 5 volumes of water and subjected to treatment as described in Example XX whereupon the desired p-hexylmercaptobenzhydryl 2-dimethylaminoethyl sulfide hydrochloride was obtained as a white crystalline solid which after recrystallization from acetone had the melting range 131–132° C.

EXAMPLE XXIII

*p-Hexylmercaptobenzhydryl 2-(4-morpholinyl)-ethyl sulfide hydrochloride*

A solution of p-hexylmercaptobenzhydryl chloride (30 g.) in absolute alcohol (50 ml.) was treated with thiourea (7.5 g.) and the mixture was refluxed 2 hours on the steam bath. A solution of sodium hydroxide (18 g.) in water (60 ml.) was added and refluxing was continued another 2 hours. A solution of 2-(4-morpholinyl)-ethyl chloride hydrochloride (25 g.) in alcohol (100 ml.) was then added and refluxing was continued a further 3 hours. The reaction mixture was then poured into 5 volumes of water and subjected to treatment as described in Example XX whereupon the desired p-hexylmercaptobenzhydryl 2-(4-morpholinyl)-ethyl sulfide hydrochloride was obtained as a white crystalline solid which upon recrystallization from acetone had the melting range 124–126° C.

EXAMPLE XXIV

*p-Octylmercaptobenzhydryl 2-dimethylaminoethyl sulfide hydrochloride* p-Octylmercaptobenzhydryl mercaptan (16 g.), (prepared in a manner similar to that described in Example V for the corresponding butyl compound, by using octyl phenyl sulfide instead of butyl phenyl sulfide), B. P. 208° C., at 60 mm. was dissolved in 96% alcohol (50 ml.) and mixed with a solution of sodium hydroxide (6 g.) in water (20 ml.). 2-dimethylaminoethyl chloride hydrochloride (10 g.) was then added and the resulting mixture was heated 4 hours on a steam bath. The reaction mixture was then subjected to treatment as described in Example V whereupon the desired p-octylmercaptobenzhydryl 2-dimethylaminoethyl sulfide hydrochloride was obtained as a white crystalline solid, M. P. 138–140° C.

EXAMPLE XXV

*p,p'-Bis(propylmercapto)-benzhydryl 2-dimethylaminoethyl sulfide citrate*

Propyl phenyl sulfide was brominated in glacial acetic acid at room temperature, yielding p-bromophenyl propyl sulfide, B. P. 180–190° C., at 60 mm. This substance was converted to p-propylmercaptobenzoic acid (M. P. 142–143° C.) by carbonation of a Grignard derivative thereof with carbon dioxide. The carboxylic acid was then treated with thionyl chloride to give the corresponding acid chloride (B. P. 155° C., at 3 mm.) which was then reacted with propyl phenyl sulfide in the presence of anhydrous aluminum chloride using carbon disulfide as the solvent, yielding p,p'-bis(propylmercapto)-benzophenone (M. P. 64° C.). The latter compound was dissolved in alcohol and reduced with zinc and potassium hydroxide to give p,p'-bis(propylmercapto)-benzhydrol (M. P. 58° C.), which was dissolved in ether. The ether solution was saturated with dry hydrogen chloride whereupon p,p'-bis(propylmercapto)-benzhydryl chloride was obtained as a colorless oil.

To p,p'-bis(propylmercapto)-benzhydryl chloride (34 g.) was added a solution of thiourea (8 g.) in absolute alcohol (60 ml.). The mixture was refluxed 3 hours on a steam bath whereafter a solution of sodium hydroxide (19.2 g.) in water (60 ml.) was added and refluxing continued a further 3 hours. A solution of 2-dimethylaminoethyl chloride hydrochloride (23 g.) in ethanol (115 ml.) was then added and refluxing continued a further 3 hours. The reaction mixture was poured into water and extracted with ether. The ether solution was washed with water and then shaken with 2 N hydrochloric acid and the resulting middle oily layer was separated, washed with ether, then treated with 2 N sodium hydroxide and extracted with ether. The ether solution was dried with anhydrous potassium carbonate and treated with a solution of citric acid in acetone to produce a white, crystalline precipitate, M. P. 85° C., of the desired p,p'-bis(propylmercapto)-benzhydryl 2-dimethylaminoethyl sulfide citrate.

EXAMPLE XXVI

*p,p-Bis(butylmercapto)-benzhydryl 2-dimethylaminoethyl sulfide citrate*

To p,p'-bis(butylmercapto)-benzhydryl chloride (60 g.) (Example XVII) was added a solution of thiourea (12.4 g.) in absolute alcohol (120 ml.) and the reaction mixture was refluxed 3 hours on a steam bath whereafter sodium hydroxide (31 g.) dissolved in water (100 ml.) was added and refluxing continued a further 3 hours. A solution of 2-dimethylaminoethyl chloride hydrochloride (39 g.) in alcohol (150 ml.) was added and refluxing continued 3 hours.

The reaction mixture was poured into water and subjected to treatment as described in Example XXV, whereupon the desired p,p'-bis(butylmercapto)-benzhydryl 2-dimethylaminoethyl sulfide citrate was obtained as a white, crystalline solid, M. P. 77–78° C.

EXAMPLE XXVII

*p,p'-Bis(n-hexylmercapto)-benzhydryl 2-dimethylaminoethyl sulfide hydrochloride* p,p'-Bis(n-hexylmercapto)-benzophenone, M. P. 58–60° C. (prepared in the same manner as the corresponding dipropyl compound in Example XXV using n-hexyl phenyl sulfide), was dissolved in alcohol and reduced with zinc and potassium hydroxide to yield p,p'-bis(n-hexylmercapto)-benzhydrol which was dissolved in ether. The ether solution was saturated with dry hydrogen chloride, whereupon p,p'-bis(n-hexylmercapto)-benzhydryl chloride was obtained as a colorless oil.

To p,p'-bis(n-hexylmercapto)-benzhydryl chloride (30 g.) was added 2-dimethylaminoethyl mercaptan (20 g.) and potassium carbonate (20 g.) and the reaction mixture was heated in an oil bath at 130° C., for 2 hours. the reaction mixture was cooled and subjected to treatment as described in Example XVI using hydrogen chloride instead of citric acid whereupon the desired p,p'-bis(n-hexylmercapto)-benzhydryl 2-dimethylaminoethyl sulfide hydrochloride was obtained as a white, crystalline solid, M. P. 156–158° C.

The terms and expressions which have been employed are terms of description and not of limitation and there is no intention in the use of such terms and expressions of excluding any equivalents of the features shown and described or portions thereof, but it is recognized that various modifications are possible within the scope of the invention claimed.

What is claimed is:

1. A compound of the class consisting of a free base, its salts with acids, and its quaternary ammonium salts, said free base having the formula

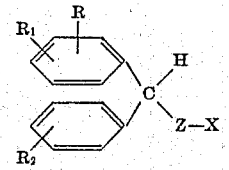

wherein R represents a member of the group consisting of hydrogen, chlorine, bromine and iodine, $R_1$ represents a member of the group consisting of lower alkyl sulfonyl, lower alkylmercapto, phenyl mercapto, lower alkyl substituted phenylmercapto, cyclohexylmercapto, lower alkyl substituted cyclohexylmercapto and, except when $R_2$ represents hydrogen, hydrogen; $R_2$ represents a member of the group consisting of lower alkylsulfonyl, lower alkylmercapto, phenylmercapto, lower alkyl substituted phenylmercapto, cyclohexylmercapto, lower alkyl substituted cyclohexylmercapto and, except when $R_1$ represents hydrogen, hydrogen; Z represents a chalcogen having an atomic weight not exceeding sulfur; and X represents a member of the group consisting of di(lower alkyl) amino-(lower alkyl), and piperidino(lower alkyl).

2. A compound consisting of salts with acids of a free base, said free base having the formula

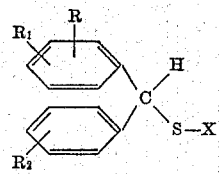

wherein R represents a halogen of atomic weight from chlorine to iodine, one of $R_1$ and $R_2$ represents a lower alkylmercapto group, the other representing hydrogen, and X represents a di(lower alkyl) amino(lower alkyl) group.

3. A compound consisting of salts with acids of a free base, said free base having the formula

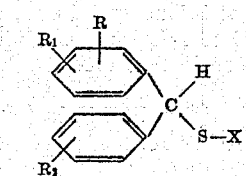

wherein R is hydrogen, one of $R_1$ and $R_2$ represents a lower alkylmercapto group, the other representing hydrogen, and X represents a di(lower alkyl) amino(lower alkyl) group.

4. A compound consisting of salts with acids of a free base, said free base having the formula

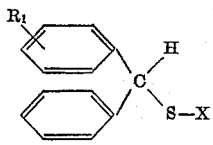

wherein $R_1$ represents a lower alkylmercapto group, X represents a di(lower alkyl) amino (lower alkyl) group.

5. A compound consisting of salts with acids of a free base, said free base being p-butylmercaptobenzhydryl 2-dimethylaminoethyl sulfide.

6. A compound consisting of salts with acids of a free base, said free base being p-hexylmercaptobenzhydryl 2-dimethylaminoethyl sulfide.

7. A compound consisting of salts with acids of a free base, said free base being m-hexylmercaptobenzhydryl 2-dimethylaminoethyl sulfide.

8. A compound consisting of salts with acids of a free base, said free base having the formula m-bromo-p'-butylmercaptobenzhydryl 2-diethylaminoethyl sulfide.

9. A compound consisting of salts with acids of a free base, said free base being p-butylmercaptobenzhydryl 2-dimethylaminopropyl sulfide.

10. p-Butylmercaptobenzhydryl 2-dimethylaminoethyl sulfide hydrochloride.

11. p-Hexylmercaptobenzhydryl 2-dimethylaminoethyl sulfide hydrochloride.

12. m-Hexylmercaptobenzhydryl 2-dimethylaminoethyl sulfide hydrochloride.

13. m-Bromo-p'-butylmercaptobenzhydryl 2 - diethylaminoethyl sulfide citrate.

14. p-Butylmercaptobenzhydryl 2-dimethylaminopropyl sulfide hydrochloride.

References Cited in the file of this patent
UNITED STATES PATENTS

| | | |
|---|---|---|
| 2,483,436 | Rieveschl | Oct. 4, 1949 |
| 2,483,671 | Rieveschl | Oct. 4, 1949 |
| 2,567,351 | Rieveschl | Sept. 11, 1951 |
| 2,577,234 | Cusic | Dec. 4, 1951 |